United States Patent [19]
Gorbet et al.

[11] Patent Number: 6,072,480
[45] Date of Patent: Jun. 6, 2000

[54] METHOD AND APPARATUS FOR CONTROLLING COMPOSITION AND PERFORMANCE OF SOUNDTRACKS TO ACCOMPANY A SLIDE SHOW

[75] Inventors: David Paul Harris Gorbet, San Francisco, Calif.; Annette Marie Crowley, Bellevue, Wash.; Vincent Teng-Wei Chun, San Bruno, Calif.; Dennis Robert Austin, Los Altos, Calif.; Bakul Vinodchandra Patel, Santa Clara, Calif.; Paul O. Warrin, Sunnyvale, Calif.

[73] Assignee: Microsoft Corporation, Redmond, Wash.

[21] Appl. No.: 08/964,940

[22] Filed: Nov. 5, 1997

[51] Int. Cl.⁷ .................................................. G06F 17/30
[52] U.S. Cl. .......................... 345/302; 345/329; 345/330
[58] Field of Search .................................... 345/302, 329, 345/330

[56] References Cited

U.S. PATENT DOCUMENTS

| | | | |
|---|---|---|---|
| 4,526,078 | 7/1985 | Chadabe | 84/602 |
| 5,265,248 | 11/1993 | Moulios et al. | 395/650 |
| 5,613,909 | 3/1997 | Stelovsky | 463/1 |
| 5,692,213 | 11/1997 | Goldberg et al. | 395/806 |
| 5,753,843 | 5/1998 | Fay | 84/609 |
| 5,917,480 | 6/1999 | Tafoya et al. | 345/302 |

OTHER PUBLICATIONS

Wodaski, Ron, *Multimedia Madness!*, SAMS Publishing, USA, PP. 25–32, 137–146), 1992.

*Delta Graph Professional, For Macintosh*, Delta Point, Inc., Monterey, California, 1989. Chapter 13.

*Microsoft PowerPoint for Windows 95, Step by Step*, Microsoft Press, Redmond, Washington, 1995. "Getting Ready"; Lessons 1, 2, 12, and 13; Appendix B.

*Primary Examiner*—Thomas G. Black
*Assistant Examiner*—William Trinh
*Attorney, Agent, or Firm*—Christensen O'Connor Johnson & Kindness PLLC

[57] ABSTRACT

A computer-based system and method of creating and performing a soundtrack to accompany an electronic slide show presentation is disclosed. The method includes receiving input from a slide presentation author, the input specifying when the soundtrack is to begin, end, or change. The input also includes a specification of elements that control the soundtrack content. During an electronic slide show, when each slide (212) is displayed, the soundtrack specifications associated with the displayed slide (212) are retrieved. Based on the specifications, a music engine (230) is invoked with commands to control the composition and performance of a soundtrack that accompanies the currently displayed slide. The method also includes receiving specifications of motifs that are triggered to accompany predetermined events occurring during the electronic slide show.

25 Claims, 6 Drawing Sheets

METHOD AND APPARATUS FOR CONTROLLING COMPOSITION AND PERFORMANCE OF SOUNDTRACKS TO ACCOMPANY A SLIDE SHOW

FIELD OF THE INVENTION

The present invention relates to the field of slide presentation computer software and, in particular, to methods and systems for playing audio soundtracks to accompany a slide show.

BACKGROUND OF THE INVENTION

Slide presentation programs are computer programs that enable a user to create, edit, manage, and perform "presentations" on a computer. One example of a popular slide presentation program is Microsoft PowerPoint, available from Microsoft Corporation, of Redmond, Washington. A slide presentation includes a set of electronic "slides," each slide corresponding to one screen or page of output. An electronic slide may also be converted to a 35 mm or overhead transparency and displayed in a standard slide projector or overhead projector. Each slide contains one or more objects, such as text, graphical images, or graphic animation. A slide may also include a sound object that is played when the slide is displayed during a "slide show" performance.

A slide presentation program "performs" a slide show by sequentially displaying a series of slides contained within the slide presentation. The slides are displayed on a computer screen or projected onto a separate surface. During a performance of a slide show, a "presenter" controls the performance by invoking commands to "advance" to the next slide. A command can be entered using a keyboard, a mouse, or another suitable input device. Alternatively, an author of a slide presentation can include slide "timings" with each slide. A slide timing corresponding to a slide indicates the number of seconds that the slide is displayed before the slide presentation program automatically advances to the next slide. During a performance of a slide show, a slide presentation program automatically advances to the next slide when the current slide's timing ends. An ordered sequence of slides is predetermined by a slide presentation author. During a performance of a slide show, a presenter can enter commands to alter the sequence of slides.

An audio file containing audio data can be optionally associated with each slide of a slide presentation. During a slide show, when a slide is displayed, the slide presentation program retrieves the audio file associated with the slide, if any, and plays the sound represented by the audio data within the file. "WAV" and Musical Instrument Digital Interface (MIDI) are two well known formats for storing audio data. The Audio Interchange File Format (AIFF) is a well known format for storing audio data on Apple Macintosh computers.

In order to create a slide presentation that has an accompanying soundtrack, such as a music soundtrack, an author creates or locates appropriate audio files to embed in the presentation, and then associates an individual audio file with each slide, in an appropriate and aesthetically pleasing sequence. During a slide show, if the playing of an audio file is interrupted before completion, the soundtrack stops abruptly. If transition to a new slide results in the playing of a second audio file while a first audio file is playing, the first audio file is abruptly terminated before beginning the second audio file. It is therefore difficult to create and present an aesthetically pleasing soundtrack to accompany a slide show. It is also difficult to create and perform a soundtrack that is appropriate to specific slides within a slide presentation.

It is desirable to have a mechanism that allows a slide presentation author to designate the creation and playing of an aesthetically pleasing and appropriate soundtrack during a slide show. Preferably, such a mechanism will provide a slide presentation author with a way to specify the type of soundtrack that is created and played to accompany the display of each slide during a slide show. Additionally, a preferable mechanism will automatically create aesthetically pleasing transitions between music segments when changes occur during a slide show, either as a result of specifications by an author, or control by a slide show presenter. Further, a preferable mechanism will provide a presentation author with a way to designate that short musical "motifs" are to be played upon the occurrence of certain events. The present invention is directed to providing such a mechanism.

SUMMARY OF THE INVENTION

In accordance with this invention, a system and computer based method of creating and performing a soundtrack to accompany an electronic slide show presentation is provided. The method includes receiving input from a slide presentation author, the input specifying when the soundtrack is to begin, end, or change. The input also includes a specification of elements that control the soundtrack content. During an electronic slide show, when each slide is displayed, the soundtrack specifications associated with the displayed slide are retrieved. Based on the specifications, a music engine is invoked with commands to control the composition and performance of a soundtrack that accompanies the currently displayed slide.

In accordance with other aspects of this invention, information specifying the performance of a desired soundtrack is stored, a set of slides is sequentially displayed, and information specifying a desired soundtrack is retrieved. The mechanism of the invention automatically composes the desired soundtrack and automatically performs the composed soundtrack concurrently with the displaying of the set of slides. Preferably, information is stored specifying a beginning of a soundtrack, wherein the beginning of a soundtrack is associated with the display of a slide. Also, in response to a command to display a slide, a command is invoked to begin composing the desired soundtrack.

In accordance with still other aspects of this invention, the stored information includes information specifying that a soundtrack is to be modified and, during the slide show, the soundtrack is modified based upon the modification information. Modifying the soundtrack may include terminating the performance of a soundtrack, as specified by the stored modification information. The modification information may also include information that specifies a change in content of a soundtrack, the specified change causing the content of a soundtrack to be changed during the slide show.

In accordance with yet still other aspects of this invention, a soundtrack transition segment is automatically composed and performed, wherein the soundtrack transition segment differs from the soundtrack segment performed prior to the soundtrack transition segment.

In accordance with further aspects of this invention, the mechanism of the invention automatically composes a first portion of the desired soundtrack based on a portion of the information associated with the first slide, and automatically composes a second portion of the desired soundtrack based on a portion of information associated with a second slide. Each portion of the information is associated with a respective slide, and the automatic performance based on each portion of the information occurs while the corresponding slide is being displayed.

In accordance with further other aspects of this invention, motif information specifying a performance of a desired motif is stored in response to user input. The motif information is used to automatically perform a desired motif in response to a predetermined event, such as the display of an animation sequence. Preferably, motif information can be specified for each electronic slide, and the automatic performance of a motif during the display of an electronic slide is based upon the motif specification corresponding to the displayed slide.

As will be readily appreciated from the foregoing description, a method of creating and performing a soundtrack to accompany an electronic slide show presentation performed in accordance with the invention provides a way of enhancing a slide presentation by adding an accompanying soundtrack. The invention allows a slide presentation author to create an enhanced slide presentation without having to locate a preexisting soundtrack. A slide presentation enhanced by the invention can include a soundtrack that varies during the performance of a slide show according to the specifications of a slide presentation author. The slide presentation can specify that the soundtrack is to vary based upon the author's knowledge of each slide. The automatic creation of transitional soundtrack segments provides an aesthetically pleasing soundtrack when the soundtrack changes, either due to prior specification by the soundtrack author, or control of the slide show by a slide show presenter.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention provides a mechanism for designating, creating, and playing custom music soundtracks to accompany an electronic slide show. The mechanism of the invention receives specifications of a soundtrack associated with one or more slides of a slide presentation and stores the specifications in a manner that includes an association between each specification and a corresponding slide. The specification information is automatically saved and associated with the slide presentation. During a subsequent slide show, a mechanism of the invention automatically retrieves the specification information, dynamically creates a music soundtrack by invoking a music engine that composes and plays the music soundtrack corresponding to the currently displayed slide. During transitions between slides, the mechanism of the invention further signals the music engine to create aesthetically pleasing transitions between soundtrack segments or terminate the playing of a soundtrack, as appropriate.

Figure 1:
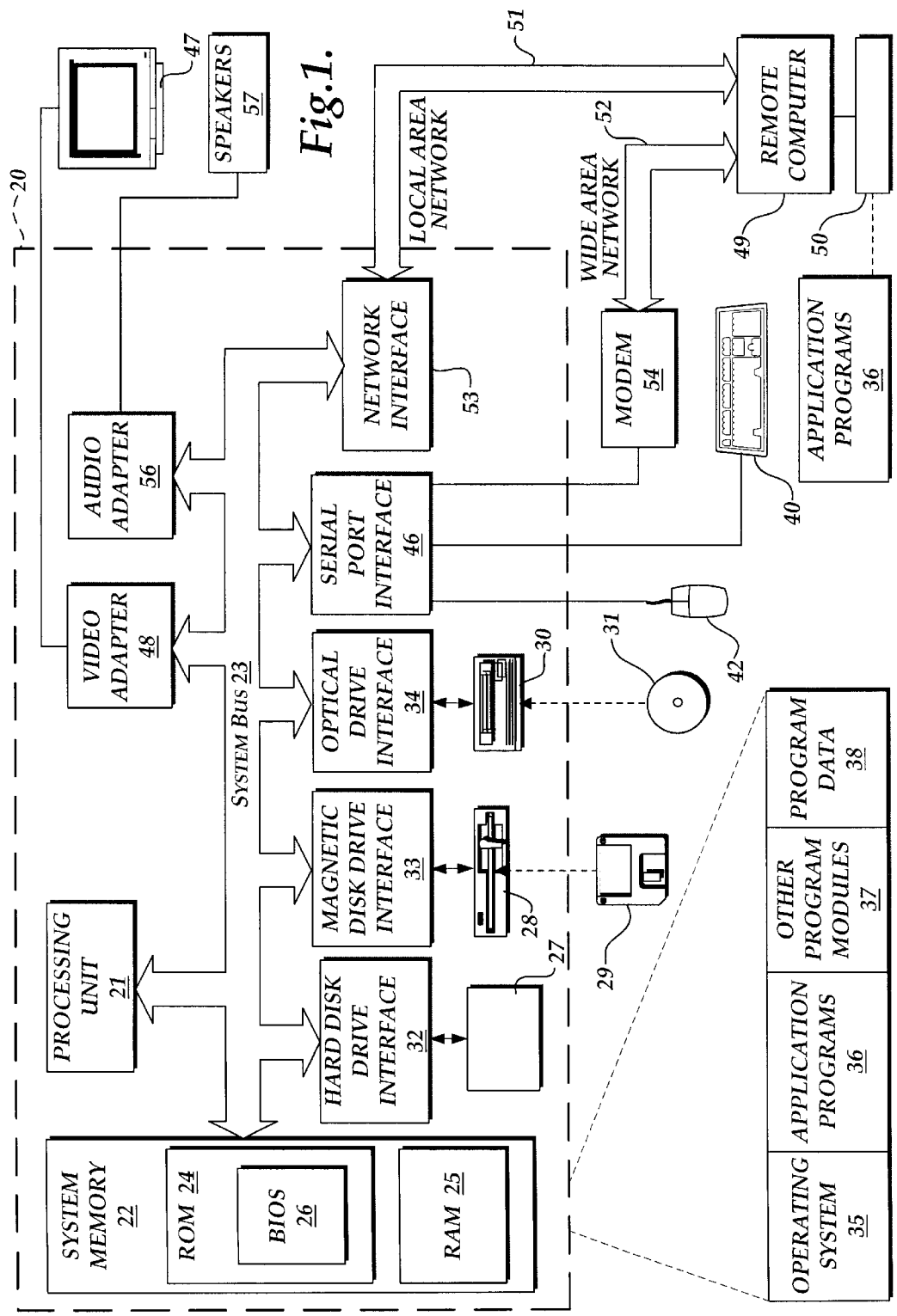
FIG. 1 is a block diagram of a general purpose computer system for implementing the present invention.

In accordance with the present invention, a slide presentation program executes on a computer, preferably a general purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52, Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
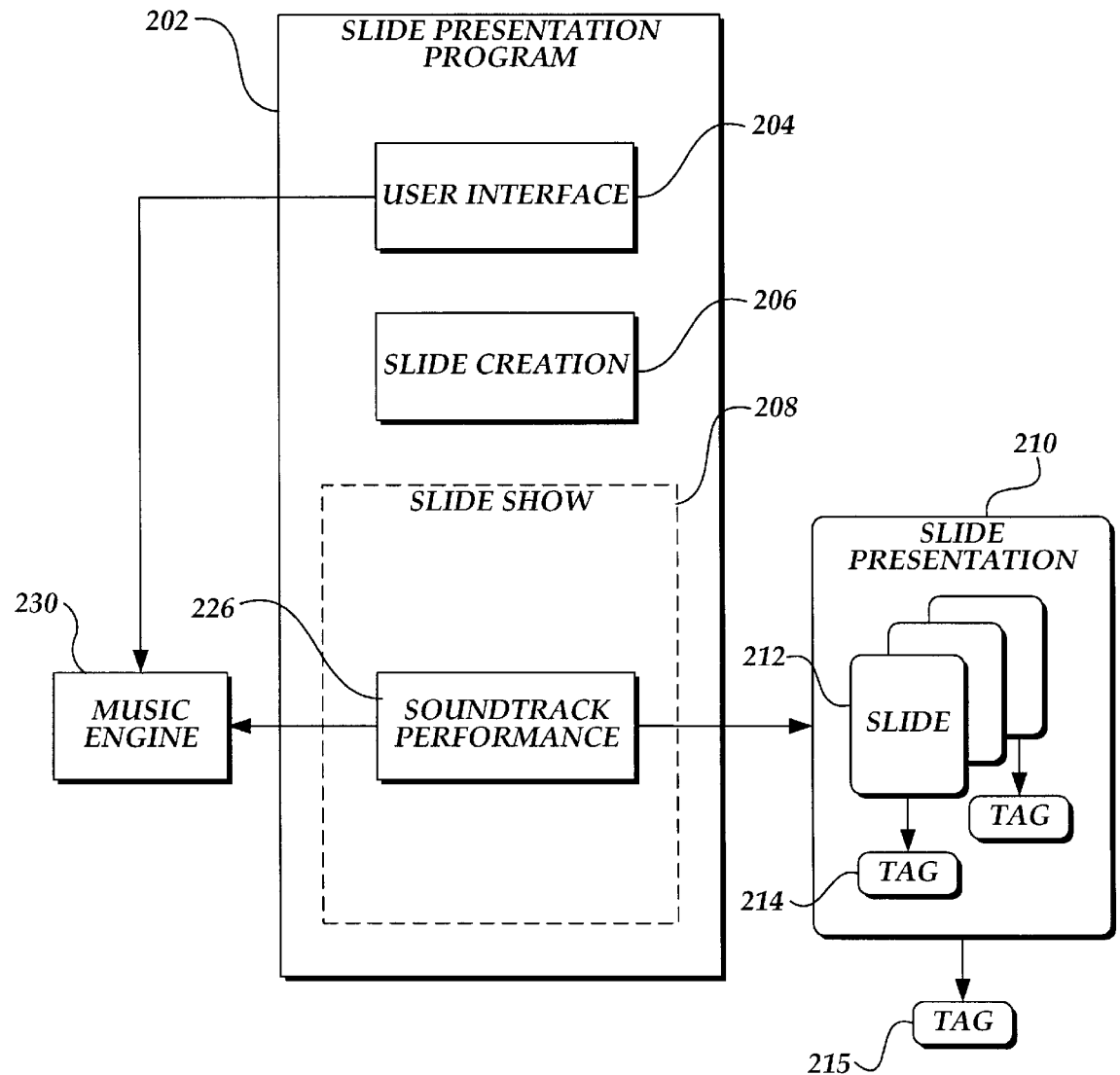
FIG. 2 is a block diagram illustrating an architecture of a slide presentation program, in accordance with the present invention.

FIG. 2 illustrates an architecture of a slide presentation program 202 in accordance with the present invention. A slide presentation program 202 provides an author with the ability to create and edit a set of one or more "slides" 212 and to "present" or display one or more of the set of slides. The set of slides is referred to as a "slide presentation" 210. A slide presentation 210 is generally stored on a computer storage medium, such as a disk drive. The computer storage medium may be directly connected to the computer that performs a side show, or it may be connected to a remote computer on a local area network (LAN) or a wide area network (WAN), such as the Internet. A slide is a discreet collection of information, including visual information such as text, graphic images, or animation. A slide may also comprise other information, including sounds and interactive information, such as hyperlinks.

The slide presentation program 202 includes a user interface (UI) module 204. The UI module 204 presents a "custom soundtrack" dialog window 302 (FIG. 3), discussed in further detail below. Briefly, the custom soundtrack dialog window displays information pertaining to currently set parameters controlling the creation and playback of custom soundtracks. The slide presentation program 202 also includes a slide creation module 206, which provides the user with the ability to create, edit, and organize a set of slides. Techniques for creating, editing, and organizing a set of slides are known in the art, and are not discussed in detail here, except where relevant to the present invention.

The slide presentation program 202 further includes a slide show module 208 that contains program code for controlling an electronic slide show. During an electronic slide show, the slide show module 208 retrieves a slide 212 and displays the slide on an output medium, such as a display monitor (FIG. 1). Since a slide can contain multimedia data, displaying a slide includes playing audio data, as well as visually displaying the contents of the slide. Specifically, displaying a slide includes displaying the text and graphics contained within the slide, which may include animation, and playing a "sound clip," if any, embedded in the slide. A sound clip is a block of data representing sound, and can be stored in one of a plurality of storage formats, such as WAVE, MIDI, or AIFF.

The slide show module 208 provides several options for presenting an electronic slide show. The slide show module may automatically display a predetermined sequence of slides 212, displaying each slide for a corresponding predetermined amount of time. Alternatively, the slide show module 208 may display each slide 212 in a predetermined sequence of slides, pausing after displaying each slide until a user performs an operation instructing the slide show module to "advance" by retrieving and displaying the next slide in the sequence of slides. The slide show module 208 also provides the ability for a user to present slides in a sequence that is not predetermined, by specifying the number or name of a slide 212 within the slide presentation 210. A slide 212 may also have "links" built into it by a slide author using the slide creation module 206. The link includes a visual area on the slide and a corresponding address of a target object. When the target object is a slide and a user selects the link area on the slide, the slide show module 208 automatically retrieves and displays a designated target slide. The target slide may be a slide within the same slide presentation 210 as the current slide, or it may be a slide in a different slide presentation. The target object may be an object other than a slide, such an HTML document or a word processing document.

The slide show module 208 also provides an ability to "perform" a slide show rehearsal session. During a slide show rehearsal session, the slide show module 208 sequentially retrieves and displays slides 212 within the slide presentation 210. A slide presentation author indicates when a transition to the next slide is to be made, by entering a command using the keyboard 40 (FIG. 1), mouse 42, or other input device. The slide show module 208 records the amount of time that each slide 212 is displayed, and stores the amount of time corresponding to each slide. During a subsequent slide show performance, the slide show module 208 retrieves the recorded amount of time corresponding to a currently displayed slide, displays the current slide with a specified duration of time, and then automatically retrieves and displays the next slide in the predetermined sequence. In this manner, the slide show module 208 performs a slide show with slide transition timings matching the timings during the previous slide show rehearsal session. Alternatively, a user can manually enter a value representing the time for each slide, and these timings are used during a subsequent slide show performance.

As depicted in FIG. 2, each slide 212 within a slide presentation 210 has zero, one or more associated tags 214. In one actual embodiment of the invention, each tag has a name and a binary block of data. The tags in the actual embodiment are maintained in a linked list of tags that are associated with the corresponding slide. Each tag 214 associated with a slide has a unique name, that is used to identify the tag. The slide presentation program 202 can locate all of the tags associated with a slide by retrieving the first tag and following the linked list to retrieve additional tags.

As will be recognized by those skilled in the art of computer programming, and others, the tags can also be maintained utilizing other data structures, such as tables, or arrays. The name of the slide can be in various forms, such as alphanumeric or numeric.

FIG. 2 also illustrates a presentation tag 215 associated with the slide presentation 210. In one embodiment, illustrated in FIG. 4B and discussed below, a slide presentation 210 has 0, 1, or more associated presentation tags 215, preferably maintained in a linked list of tags. Each presentation tag 215 contains information that specifies a music soundtrack. The use of presentation tags is described in further detail below. The slide show module 208 also includes a soundtrack performance module 226 that controls the creation and playing of an audio soundtrack during a slide show performance. As explained in further detail below, during a slide show performance, when the slide show module 208 retrieves and displays a slide 212, the soundtrack performance module 226 retrieves the corresponding soundtrack tag and controls the soundtrack performance in accordance with the information contained within the soundtrack tag 214.

In a preferred architecture, the soundtrack performance module 226 controls the creation and playing of an audio soundtrack by sending commands and data to a music engine 230 that is external to the slide presentation program 202. The music engine 230 can be part of the operating system, or may be implemented as nonoperating system software. A music engine that composes and plays music is disclosed in now U.S. Pat. No. 5,754,843 to *System and Process for Composing Musical Sections*, filed on Feb. 6, 1995, the subject matter of which is incorporated herein by reference. As should be recognized by one skilled in this art, and others, software that implements the functionality of the music engine 230 can exist in a variety of locations, and may not be external to the slide presentation program 202. It should also be recognized by those skilled in this art that some or all of the functions of the music engine 230 can be implemented in hardware, rather than software.

In a preferred architecture, at least a part of the user interface module 204 and the soundtrack performance module 226 are implemented as add-in programs. Microsoft PowerPoint provides the ability to link add-in programs, which are supplemental programs that extend the capabilities of the presentation manager. The Microsoft Office 97 Visual Basic Programmers Guide, published by Microsoft Press (ISBN:1-57231-340-4), contains further information about add-in programs. As should be recognized by one skilled in the art of computer programming, and others, software that implements the functionality of the user interface module and the soundtrack performance module can be implemented in a variety of ways, including being linked as an integral part of the slide presentation program.

Figure 3:
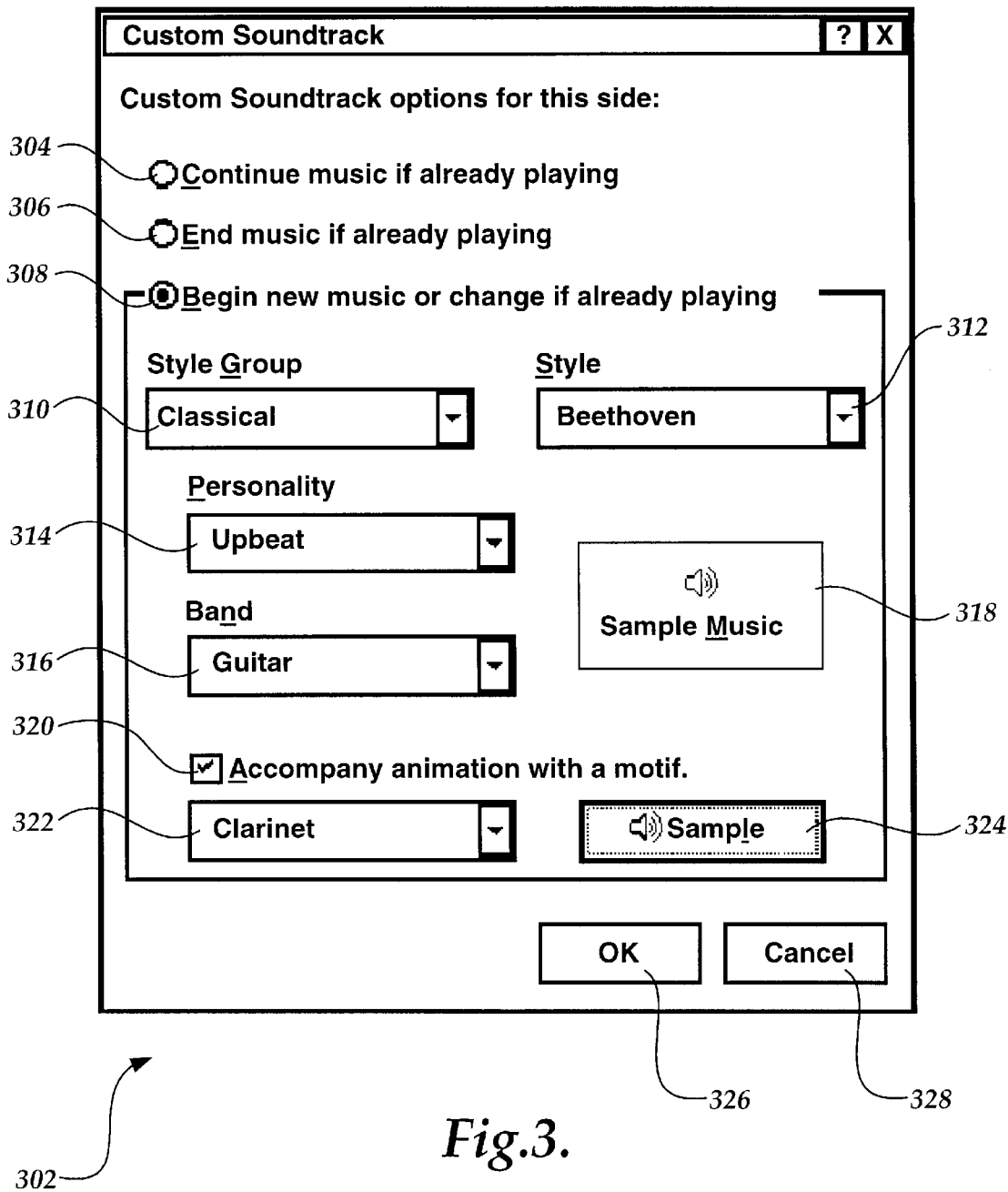
FIG. 3 is a pictorial representation of a "Custom Soundtrack" dialog window produced in accordance with the present invention.

FIG. 3 illustrates a "custom soundtrack" dialog window 302 that is displayed and controlled by the user interface module 204 (FIG. 2) in one actual embodiment of the invention. The user interface module 204 displays the custom soundtrack dialog window 302 in response to a user's selection of a menu item in the slide presentation program 202. This dialog window allows a user to store information in a tag 214 associated with the currently active slide. The currently active slide is the slide that is displayed when the user invokes the custom soundtrack dialog window. As illustrated in FIG. 3, the custom soundtrack dialog window allows an author to select one of three custom soundtrack options, each option having a corresponding radio button. In one actual embodiment of the invention, illustrated in FIG. 5 and discussed below, selection of a "continue music" radio button 304 results in the currently active slide having no soundtrack tag. Selecting the "continue music" radio button causes the user interface module 204 to remove any soundtrack tags from the currently active slide. Selection of an "end music" radio button 306 causes the user interface module 204 to create a soundtrack tag having an "end music" command. A soundtrack tag having an end music tag is referred to as an "end music tag." Selection of a "begin new music" radio button 308 causes the user interface module 204 to create a soundtrack tag having a "begin new music" command. A soundtrack tag having a "begin new music" command is referred to as a "begin new music tag."

During a slide show, if the soundtrack performance module 226 retrieves a slide that does not have a soundtrack tag, it maintains the current state of the soundtrack. If the soundtrack is currently playing, the soundtrack continues playing. If a soundtrack is not playing, there continues to be no soundtrack playing. If, during a slide show, the soundtrack performance module 226 retrieves a slide having an "end music" tag, the soundtrack performance module 226 instructs the music engine 230 to compose a quick finale to the music. The finale ensures that the music ends smoothly, rather than being abruptly cut off. The finale that is composed depends upon the style and personality of the music that is playing, as discussed in further detail below. If a soundtrack is not playing when the soundtrack performance module encounters an "end music" tag, the "end music" tag has no effect.

During a slide show performance, if the slide show module 208 encounters a slide having a "begin new music" tag, the soundtrack performance module 226 retrieves the soundtrack specifications contained within the tag and invokes the music engine 230 with instructions to begin composing music that conforms to the soundtrack specifications. If music is not currently playing, the music engine 230 composes an appropriate beginning, and then continues to compose and play music in accordance with the instructions from the soundtrack performance module 226. If music is already playing when the begin new music tag is encountered, the music engine composes an "audio bridge" between the currently playing music and the new music. An audio bridge is an aesthetically pleasing soundtrack transition segment between music segments having differing styles or other parameters. After the audio bridge completes, the music engine 230 continues to compose and play music in accordance with the most recent instructions from the soundtrack performance module 226.

FIG. 3 illustrates musical elements that a presentation author may select in order to control the type of music that is composed, in one actual embodiment of the invention. A "style group" drop-down list box 310 lists categories of music styles, and allows an author to select one of the categories. Each category has an associated set of music styles that is displayed in a style drop-down list box 312 when the category name is selected in the style group drop-down list box 310. For example, in one actual embodiment of the invention, a style category of "classical" has an associated set of styles, some of which are named after classical composers.

A "personality" drop-down list box 314 allows an author to select a music personality, which defines how the musical style is played. Each musical style may have a different set of personalities that apply to that style. For example, a classical music style may provide romantic, sad, upbeat, or whimsical personalities. A "band" drop-down list box 316 allows selection of a band, which defines the combination of instruments used to compose the music. For example, in one actual embodiment, a classical musical style may be played with guitars, harpsichords, manic bells, plucked strings, synthesizers, or a default band.

A preview button 318, labeled "sample music" in FIG. 3, on the custom soundtrack dialog window 302 allows an author to preview music that will be composed to accompany the presentation according to the current settings in the custom soundtrack dialog window. The preview button 318 is a toggle button, so that when it is depressed, it remains depressed until it is selected again. When the preview button 318 is depressed, the currently selected style is played according to the currently selected personality and band. If an author modifies the currently selected style, personality, or band while music is being previewed, the music is changed to reflect the new selections. This allows a presentation author to determine the exact combination of parameters in order to produce a desired effect. It also provides an author with a preview of a musical transition based upon the current settings.

A motif is a short musical solo that is played whenever a predetermined event occurs. A motif checkbox 320 allows a presentation author to determine whether a motif is to be played whenever an animation occurs during a slide show. Animations are typically performed on text or graphical objects as part of a presentation technique to progressively disclose information on a slide. If the motif checkbox 320 is selected, a motif is played every time an animation occurs during a slide show. A motif drop-down list box 322 allows an author to select from a set of motif names associated with the selected style. For example, in one actual embodiment, a Beethoven style has an associated set of motifs named "bassoon," "clarinet," "kettle drums," and "the hunt." A sample button 324 plays the currently selected motif. The sample button 324 is not a toggle button, and can be selected multiple times, each selection causing the music engine to play a motif. In one actual embodiment, motifs can overlap each other, so that more than one can play concurrently.

The invention may also include additional elements that a presentation author may select in order to control the music that is composed and performed. For example, a user may be allowed to control audio volume, balance, specify individual instruments, or other options to customize a soundtrack.

The custom soundtrack dialog window 302 further includes an OK button 326 and a cancel button 328 for dismissing the dialog window. If the begin new music radio button 308 is selected when a user clicks on the OK button 326, the slide presentation program 202 creates a new soundtrack tag for the current slide, or revises a previously existing soundtrack tag for the current slide. The soundtrack tag contains information indicating the selections made in the custom soundtrack dialog window 302. Clicking on the Cancel button 328 cancels any changes made in the current invocation of the custom soundtrack dialog window 302. If the end music radio button 306 is chosen when the OK button 326 is selected, an end music tag is created and associated with the current slide, if one does not already exist. If the continue music radio button 304 is chosen when the OK button 326 is selected, the existing soundtrack tag associated with the current slide is deleted, if one exists.

In one actual embodiment of the invention, a set of one or more data files contains information regarding soundtrack styles, personalities, bands, and motifs that are available for selection by a presentation author. The UI module 204 (FIG. 2) retrieves data from these data files to populate the custom soundtrack dialog window 302.

Figure 4A:
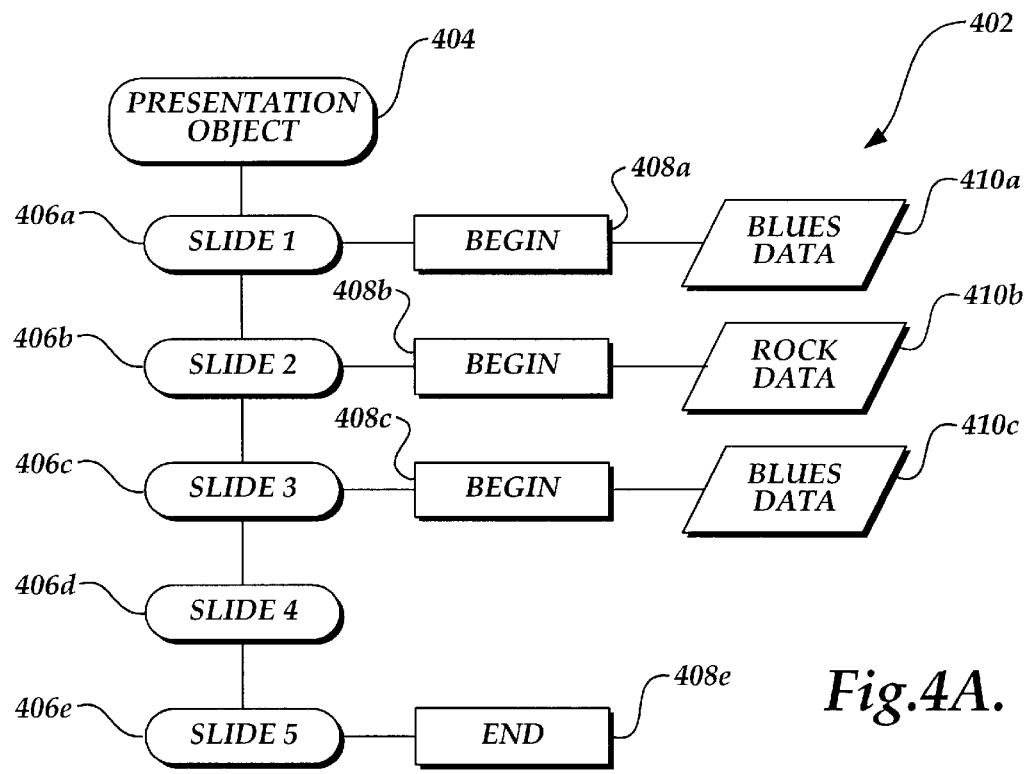
FIG. 4A illustrates an exemplary slide presentation with associated soundtrack specification information in accordance with one embodiment of the invention.

FIG. 4A illustrates an exemplary slide presentation 402 with associated soundtrack specification information in accordance with one embodiment of the invention. The exemplary slide presentation 402 depicted in FIG. 4A is represented by a presentation object 404 having five (5) sequentially linked slides 406a–e. The first slide 406a has a corresponding begin tag 408a that specifies blues data 410a representing the information that a soundtrack with the blues style is to accompany the first slide 406a. The second slide 406b has a corresponding tag 408b with associated rock data 410b that specifies a rock soundtrack is to accompany a second slide 406b. The third slide 406c has a corresponding begin tag 408c that specifies blues data 410c, similar to the soundtrack specification for the first slide 406a.

The fourth slide 406d has no corresponding tag. As discussed above, an absence of a tag indicates that a soundtrack is to continue playing if one is already playing when the corresponding slide is displayed. The fifth and last slide 406e has a corresponding end tag 408e, which indicates that any accompanying soundtrack is to be terminated when the last slide 406e is displayed. No additional data is necessary for an end tag.

Figure 4B:
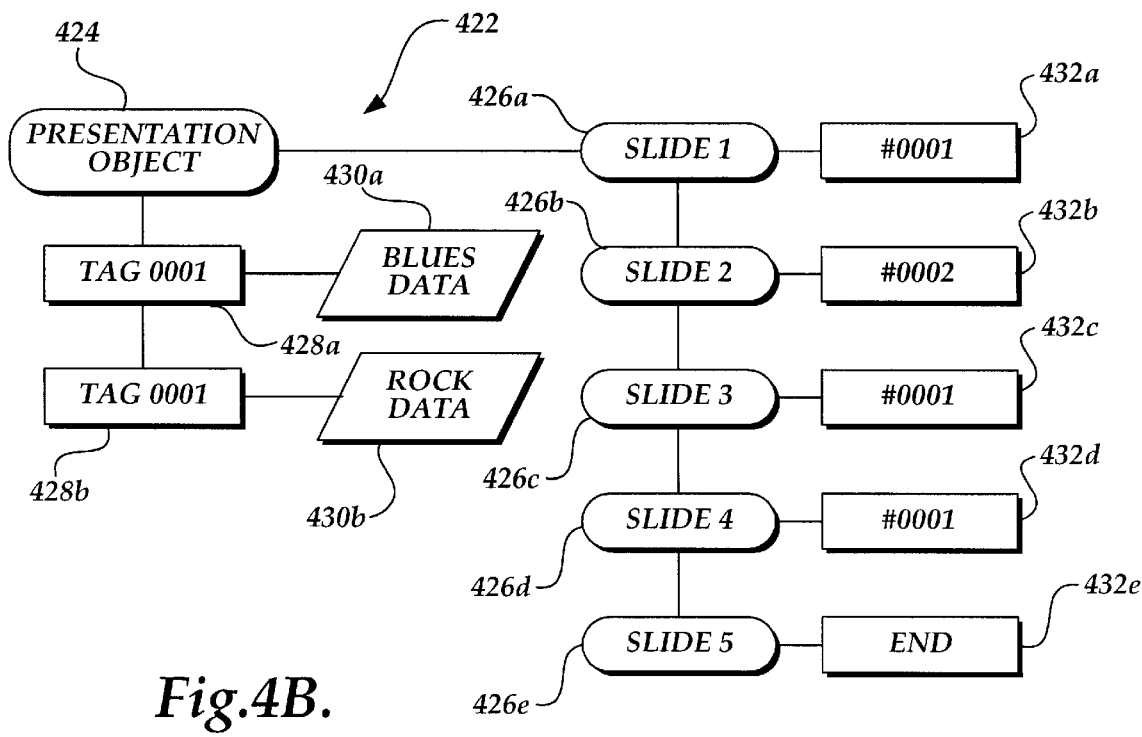
FIG. 4B illustrates the exemplary slide presentation of FIG. 4A with associated soundtrack specification information in accordance with an alternative embodiment of the invention.

FIG. 4B illustrates an alternative embodiment in which a different mechanism is used to store the soundtrack specification information. In FIG. 4B, a slide presentation 422 is represented by a presentation object 424 having five (5) sequentially linked slides 426a–e. The presentation object 424 also has a linked list of tags, including a first tag 428a and a second tag 428b. The first tag 428a includes information that specifies a blues soundtrack. The second tag 428b contains information that specifies a rock soundtrack. As will be recognized by those skilled in the art of computer programming, and others, the tags may be associated by various data structures, such as tables or arrays.

Each of the electronic slides 426a–e has a corresponding tag 432a–e. The first slide 426a has a corresponding tag 432a that references the first tag 428a linked to the presentation object 424. The tag 432a corresponding to the first slide 426a therefore indirectly contains information that specifies a blues soundtrack is to accompany the first slide 426a. Similarly, the second slide 426b has a corresponding tag 432b that references the second tag 428b linked to the presentation object 424. The tag 432b corresponding to the second slide 426b therefore indirectly contains information specifying that a rock soundtrack is to accompany the second slide 426b.

Similarly, the tag 432c corresponding to the third slide 426c and the tag 432d corresponding to the fourth slide 426d reference the first tag 428a linked to the presentation object 424 and indirectly indicate that a blues soundtrack is to accompany slides three and four. The indirect reference provided by the tag 432c corresponding to the third slide 426c therefore provides the information specified by the tag 408c corresponding to the third slide 406c in FIG. 4A. The tag 432d corresponding to the slide 426d provides the information of the fourth slide 406d in FIG. 4A, where a lack of a tag indicated that a previously begun soundtrack is to continue. Having a tag 432d corresponding to the fourth slide 426d, where the tag 432d indicates the soundtrack information, provides an advantage when a slide show begins at, or jumps to, the fourth slide 426d. In such a situation, the mechanism of the invention can easily determine the desired soundtrack to accompany the fourth slide 426d.

Finally, an end tag 432e corresponds to the last slide 426e, and indicates that the soundtrack is to terminate when the last slide 426e is displayed. Alternatively, the absence of a tag associated with a slide can indicate that the soundtrack is to terminate. In this alternative, when a slide having no corresponding tag is displayed, the soundtrack is terminated.

As illustrated in FIG. 4B and discussed above, each specified set of soundtrack style data exists in a presentation once, stored as tags linked to the presentation object. Individual slides that have a soundtrack are tagged with a key that references the style data for begin and continue tags. Though not illustrated by the exemplary slide show presentation of FIG. 4B, where no soundtrack is specified to accompany a slide, the slide has no soundtrack tag.

The embodiment illustrated in FIG. 4B also provides an advantage of simplifying the ability to perform a global "replace style," where all instances of a music style are replaced with a different style. This allows musical styles to be part of a presentation template. When a new template is applied to a presentation, the musical style could change, in addition to changing the visual style. The alternative embodiment also allows simplified application of a musical style to a range of slides, either contiguous or discontiguous.

Figure 5:
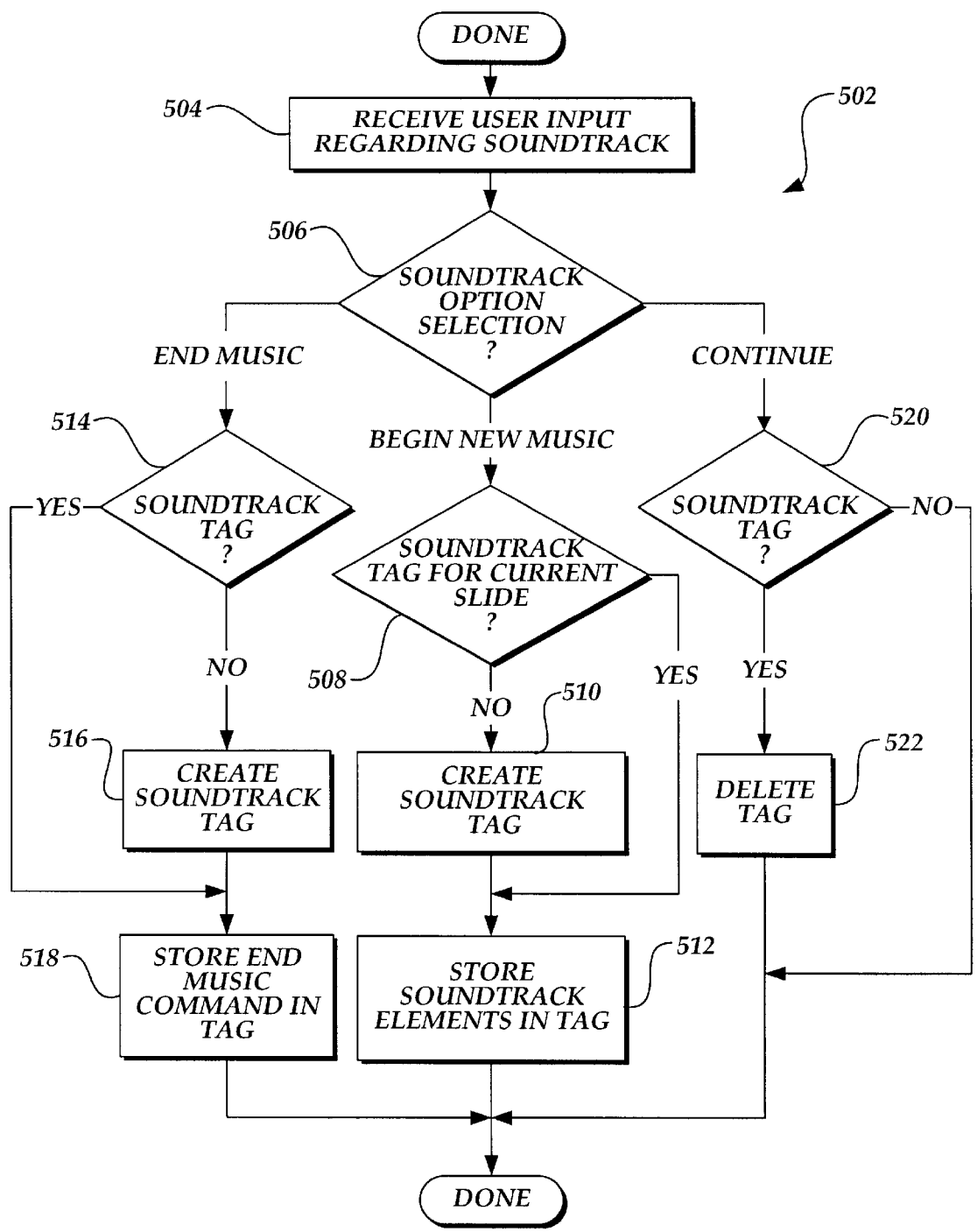
FIG. 5 is a flow diagram illustrating the process of specifying a soundtrack.

FIG. 5 illustrates a process 502 of receiving soundtrack selections from an author and creating or modifying a soundtrack tag associated with the current slide, in the configuration illustrated in FIG. 4A. As discussed above this process is preferably performed by the UI module 204 (FIG. 2). At step 504, the UI module receives user input specifying whether a soundtrack is to accompany the current slide. If a soundtrack is to accompany the current slide, the user input also specifies elements that control the type of soundtrack. User input is received when an author interacts with the custom soundtrack dialog window 302 and selects the OK button 326 in the custom soundtrack dialog window. At step 506, a test is made to determine which of the soundtrack options, as indicated by the radio buttons, has been selected for the current slide. If the begin new music option has been selected, flow control proceeds to step 508, where a test is made to determine whether a soundtrack tag already exists for the current slide. If a soundtrack tag does not exist for the current slide, flow control proceeds to step 510, where the user interface module 204 creates a soundtrack tag and associates the tag with the current slide. At step 512, the user interface module stores the soundtrack elements selected by the presentation author in the soundtrack tag. If, at step 508 it is determined that a soundtrack tag already exists for the current slide, the process skips step 510 and continues to step 512, where the soundtrack elements are stored in the existing tag, replacing any existing soundtrack data.

If, at step 506, it is determined that the end music soundtrack option has been selected, flow control proceeds to step 514, where a determination is made of whether a soundtrack tag already exists for the current slide. If a soundtrack tag does not exist for the current slide, flow control proceeds to step 516, where the user interface module creates a soundtrack tag and associates the tag with the current slide. At step 518, the user interface module then stores the information representing an "end music" command in the soundtrack tag. If, at the step 514, it is determined that a soundtrack tag already exists and is associated with the current slide, step 516 is skipped, and the process proceeds to step 518, where the information representing an "end music" command is stored in the tag, replacing any existing soundtrack data in the tag.

If, at the step 506, it is determined that the "continue music" option has been selected, flow control proceeds to step 520, where a test is made to determine whether a soundtrack tag is associated with the current slide. If a soundtrack tag is associated with the current slide, at step 522, the user interface module deletes the soundtrack tag. If, at the step 520, it is determined that a soundtrack tag does not exist for the current slide, the process skips step 522, since there is no tag to delete.

The process 502 can be performed for one or more slides, as controlled by the presentation author. If the process is not performed for a slide, no soundtrack tag is created or associated with the slide. This is similar to invoking the custom soundtrack dialog window 302 and selecting the "continue music" option for a slide.

In the alternative embodiment illustrated in FIG. 4B and discussed above, when a presentation author specifies a begin new music option for a slide, a presentation tag 428a or 428b (FIG. 4B) is created having the appropriate soundtrack information, if one does not already exist having the identical information. A begin new music tag 432a is created and associated with the current slide. The begin new music tag 432a refers to a corresponding presentation tag. In the alternative embodiment, when a presentation author specifies a continue option for a slide, a soundtrack begin new music tag is created referring to the presentation tag containing the soundtrack style data of the previous slide, and the begin new music tag is associated with the current slide. As discussed in further detail below, this tag is used when a presenter begins a slide presentation at a slide where a continue option has been selected, or when the presenter jumps to such a slide. When a presentation author specifies the end music soundtrack option in the alternative embodiment, an end music tag 432e (FIG. 4B) is created and associated with the current slide. Alternatively, when the end music option is selected in this embodiment, no tag is associated with the current slide.

Figure 6:
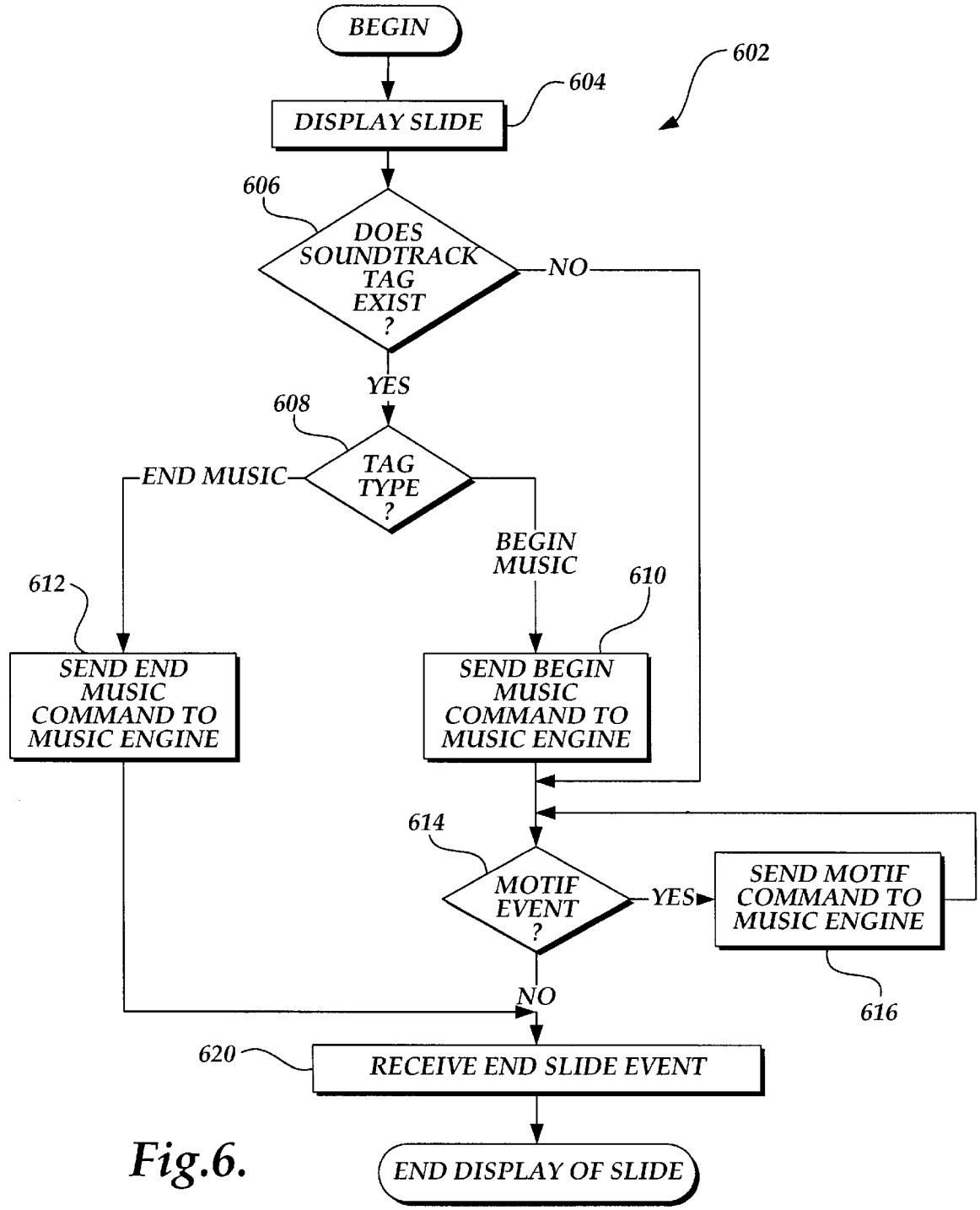
FIG. 6 is a flow diagram illustrating the process of creating and playing a soundtrack to accompany a slide presentation.

FIG. 6 illustrates a process 602 of controlling the composition and play of a soundtrack associated with a slide during a slide show. At step 604, the slide show module 208 (FIG. 2) displays a slide. At step 606, the soundtrack performance module 226 determines whether a soundtrack tag exists and is associated with the currently displayed slide. If an associated soundtrack tag exists, the process proceeds to step 608, where the soundtrack performance module 226 determines the type of soundtrack tag. If the soundtrack tag is a "begin music" tag, flow control proceeds to step 610, where the soundtrack playback module sends a "begin music" command to the music engine 230. The begin music command includes the additional information stored in the begin music tag that controls the elements of the soundtrack, as discussed above with reference to the soundtrack dialog window 302 (FIG. 3). In one actual embodiment, the performance playback module 226 does not keep track of whether a soundtrack is currently playing when it retrieves a begin music tag. Rather, the music engine 230 maintains information that allows it to know when a soundtrack is currently playing. The music engine uses this information to determine whether it is necessary to compose and play a transitional soundtrack between the playing music and the new music that will be composed and played in response to the begin music command.

If, at step 608, the soundtrack playback module determines that the soundtrack tag associated with the current slide is an "end music" tag, flow control proceeds to step 612, where the soundtrack playback module sends an "end music" command to the music engine. As discussed above, the music engine preferably maintains information that allows it to know whether a soundtrack is currently playing. If a soundtrack is currently playing when the music engine receives an end music command, the music engine composes and plays a transitional soundtrack prior to terminating the music. Following the step 612 of sending an end music command to music engine, the process 602 proceeds to step 620, which is discussed below.

Following the step 610 of sending a begin music command, the process proceeds to step 614. Also, if at step 606, the soundtrack performance module determines that a soundtrack tag does not exist for the currently displayed slide, flow control proceeds from step 606 to step 614. At step 614, the soundtrack playback module determines whether a motif event has occurred. A motif event can occur at any time during the playing of a soundtrack. Therefore, the step 614 of determining that a motif event occurs is preferably an asynchronous notification of such an event. In one actual embodiment, the display of an animation on the currently displayed slide is a motif event. It is also possible that other events are considered motif events and trigger the playing of motif. Motif events can be triggered by a user action, or as a result of other events. For example, receipt of an e-mail message may trigger a motif event. A user interacting with the slide presentation program may also trigger a motif event.

If, at step 614 it is determined that a motif event has occurred, at step 616, the soundtrack playback module sends a "motif" command to the music engine. After sending a motif command to music engine, the process 602 loops back to step 614 to determine whether another motif event has occurred. A motif event can occur zero, one, or more times during the display of a slide. As discussed above, a motif event can occur while a previous motif is still being played, and more than one motif can be playing concurrently.

If, at step 614, a motif event is not received, the process skips step 616 continues as step 620, where an end slide event is received. An end slide event can be any event that terminates display of the current slide. For example, it can be a demand or event that causes the slide show to advance to the next slide, or it can be a command or event that causes the slide show to end. Following the end slide event, the slide show module terminates the display of the current slide as part of the active slide show. As illustrated in FIG. 6, if an end music command is sent to the music engine at step 612, the process 602 proceeds to step 620, without responding to motif events. In the preferred embodiment of the invention, a motif is only performed if a soundtrack is currently playing. In an alternative embodiment, motifs can be performed in response to a motif event even if a soundtrack is not currently playing.

The process of the invention may also respond to additional events by sending commands to a music engine in order to control the soundtrack. For example, a change in focus from the presentation program to another program can cause the slide performance module to send an end music command to the music engine, temporarily pausing the soundtrack. When the focus is returned to the presentation program, the soundtrack performance module can send a begin music command to the music engine, thereby resuming the soundtrack.

In the alternative embodiment illustrated in FIG. 4B and discussed above, a soundtrack begin new music tag is associated with a slide when a slide presentation author specifies that a previously started soundtrack is to continue while the associated slide is displayed. In this embodiment, the soundtrack performance module 226 may encounter consecutive slides that have begin new music tags referencing the same music style. The soundtrack performance module 226 sends a begin music command to the music engine each time such a slide is encountered. If the soundtrack performance module encounters a slide with no soundtrack tag, it terminates the performance. This mechanism causes a soundtrack to begin correctly if the slide show skips over a slide having a begin music tag.

While the preferred embodiment of the invention has been illustrated and described, it will be appreciated that various changes can be made therein without departing from the spirit and scope of the invention.

What is claimed is:

1. A method in a computer system for performing a soundtrack to accompany an electronic slide show, comprising:

storing, according to user input, information specifying the performance of a desired soundtrack;

sequentially displaying at least one slide;

retrieving at least a portion of the information specifying a desired soundtrack;

providing the information to a music engine that automatically composes at least a portion of the desired soundtrack; and automatically performing the composed portion of the desired soundtrack concurrently with the displaying the at least one slide.

2. The method of claim 1, wherein:

storing information includes storing information specifying a beginning of the soundtrack and associating the beginning of the soundtrack with the display of at least one slide; and providing the information to a music engine that automatically composes at least a portion of the desired soundtrack includes invoking a command to the music engine to begin composing in response to a command to display said at least one slide.

3. The method of claim 2, wherein:

storing information includes storing modification information specifying a modification of the soundtrack; and providing the information to a music engine that automatically composes at least a portion of the desired soundtrack further includes:

retrieving, during the slide show, the modification information;

modifying the soundtrack based upon the modification information.

4. The method of claim 3 wherein the modification information includes termination information associating a termination of the soundtrack with the display of a slide; and modifying the soundtrack comprises instructing the music engine to automatically compose a finale to the soundtrack and terminating the performance of the soundtrack.

5. The method of claim 3 wherein the modification information includes content information specifying a change in content of the soundtrack, and modifying the soundtrack comprises the music engine modifying the content of the soundtrack.

6. The method of claim 5, wherein the step of modifying the soundtrack further comprises:
the music engine composing a soundtrack transition segment that differs from a soundtrack segment immediately prior to the transition soundtrack segment;
performing a soundtrack transition segment that differs from a soundtrack segment immediately prior to the transition soundtrack segment;
the music engine composing a modified soundtrack segment that differs from the soundtrack transition segment and differs from the soundtrack segment prior to the soundtrack transition segment; and
performing a modified soundtrack segment that differs from the soundtrack transition segment and differs from the soundtrack segment prior to the soundtrack transition segment.

7. The method of claim 1, wherein:
the electronic slide show includes a first slide and a second slide;
a first portion of the information specifying a desired soundtrack is associated with a first slide, and a second portion of the information specifying a desired soundtrack is associated with a second slide;
sequentially displaying includes displaying the first slide and displaying the second slide;
and wherein the method further comprises:
the music engine automatically composing a first portion of the desired soundtrack based on a first portion of the information;
the music engine automatically composing a second portion of the desired soundtrack based on a second portion of the information;
automatically performing the first portion of the desired soundtrack at least partially concurrently with the displaying of the first slide; and
automatically performing the second portion of the desired soundtrack at least partially concurrently with the displaying of the second slide.

8. The method of claim 7, wherein the second slide immediately follows the first slide in a display sequence, further comprising:
the music engine automatically composing a transitional soundtrack segment; and
automatically performing at least a portion of the transitional soundtrack segment prior to automatically performing based on the second portion of the information.

9. The method of claim 1, wherein:
the electronic slide show includes a first slide and a second slide;
the first slide and the second slide refer to a portion of information specifying a desired soundtrack to be performed at least partially concurrently with the display of the first slide and at least partially concurrently with the display of the second slide.

10. The method of claim 1, further comprising:
storing, according to user input, motif information specifying the performance of a desired motif; and
automatically performing the desired motif in response to a predetermined event.

11. The method of claim 10, further comprising:
displaying an animation sequence during the electronic slide show;
automatically performing the desired motif based on the motif information; and
wherein displaying an animation sequence and automatically performing the desired motif are at least partially concurrent.

12. The method of claim 11, further comprising:
automatically performing the desired motif a first time based on the motif information; and
automatically performing the desired motif a second time based on the motif information, wherein the automatically performing the desired motif a first time and the automatically performing the desired motif a second time are at least partially concurrent.

13. The method of claim 10, wherein the motif information is associated with a corresponding electronic slide, and the automatically performing the desired motif occurs concurrently with a display of the corresponding electronic slide during a slide show.

14. The method of claim 13, further comprising:
the electronic slide show includes a second slide;
storing, according to user input, second motif information specifying the performance of a second desired motif different from the first desired motif, wherein the second motif information is associated with the second electronic slide, and wherein the second electronic slide is different from the electronic slide corresponding to the first desired motif; and automatically performing the second desired motif in response to a predetermined event occurring during a display of the second electronic slide.

15. A computer-readable medium having computer-executable instructions for performing steps comprising:
displaying an electronic slide show comprising at least one electronic slide, the displaying including advancing the electronic slide show in response to predetermined events;
retrieving data describing a soundtrack to accompany the electronic slide show; providing the data to a music engine that automatically composes the soundtrack based on the retrieved data; and
automatically performing the soundtrack during the displaying the electronic slide show.

16. The computer-readable medium of claim 15, wherein said at least one electronic slide includes a first set of at least one electronic slide and a second set of at least one electronic slide, the medium having further computer-executable instructions for:
associating a first portion of the data with the first set of at least one electronic slide;
associating a second portion of the data with the second set of at least one electronic slide;
providing the first portion of the data to the music engine that automatically composes a first portion of the soundtrack based on the first portion of the data;
providing the second portion of the data to the music engine that automatically composes a second portion of the soundtrack based on the second portion of the data;
automatically performing the first portion of the soundtrack during the displaying the first set of at least one electronic slide; and automatically performing the second portion of the soundtrack during the displaying the second set of at least one electronic slide.

17. The computer-readable medium of claim 16 having further computer executable instructions for:

instructing the music engine to automatically compose a transitional soundtrack; and automatically performing the transitional soundtrack to create a transition between the performing the first portion of the soundtrack and the performing the second portion of the soundtrack.

18. The computer-readable medium of claim 15, wherein the medium further comprises:

storing motif information specifying a desired motif;

determining the occurrence of a predetermined event; and performing a motif based on the motif information and in response to the determining the occurrence of the predetermined event.

19. The computer-readable medium of claim 18, wherein the predetermined event is an animated display of information.

20. A computer-readable medium having stored thereon at least one computer file, comprising:

a plurality of slides, each slide including at least one object that is capable of being displayed by a computer; and a plurality of soundtrack data fields, each soundtrack data field containing data representative of at least a segment of a soundtrack to accompany a display of at least one of the slides, each soundtrack data field specifying information that can be used to instruct a music engine to automatically compose and perform the corresponding segment of the soundtrack.

21. The computer-readable medium of claim 20, wherein a first slide of the plurality of slides includes an associated data field specifying when an associated segment of a soundtrack is to be performed.

22. The computer-readable medium of claim 21, wherein a second slide of the plurality of slides includes an associated data field specifying a termination of the associated segment of the soundtrack.

23. The computer-readable medium of claim 20, wherein at least one slide of the plurality of slides includes an associated data field functioning to specify a motif that is to be performed in response to a predetermined event.

24. The computer-readable medium of claim 20, wherein at least one slide of the plurality of slides includes a link field functioning to link the slide with an associated data structure containing at least one soundtrack data field.

25. The computer-readable medium of claim 24, wherein at least two slides include corresponding link fields functioning to link each of the two slides with the associated data structure containing at least one soundtrack data field.

* * * * *

UNITED STATES PATENT AND TRADEMARK OFFICE
CERTIFICATE OF CORRECTION

PATENT NO.   : 6,072,480
DATED        : June 6, 2000
INVENTOR(S)  : D.P.H. Gorbet et al.

It is certified that error appears in the above-identified patent and that said Letters Patent is hereby corrected as shown below:

[54] Page 1,
Column 1,
Title.line "METHOD AND APPARATUS FOR CONTROLLING COMPOSITION AND PERFORMANCE OF SOUNDTRACKS TO ACCOMPANY A SLIDE SHOW" should read --METHOD AND APPARATUS FOR DYNAMICALLY CREATING SOUNTRACKS TO ACCOMPANY A SLIDE SHOW BY AUTOMATICALLY CONTROLLING SOUNDTRACKCOMPOSITION AND PERFORMANCE--

Column 1:
Line 1, "METHOD AND APPARATUS FOR CONTROLING COMPOSITION AND PERFORMANCE OF SOUNDTRACKS TO ACCOMPANY A SLIDE SHOW" should read --METHOD AND APPARATUS FOR DYNAMICALLY CREATING SOUNDTRACKS TO ACCOMPANY A SLIDE SHOW BY AUTOMATICALLY CONTROLING SOUNDTRACK COMPOSITION AND PERFORMANCE--

Column 4:
Line 10, "dynamically" should read --and dynamically--

Column 7:
Line 16, "name, that" should read --name that--
Line 49, "5,754,843 to" should read --5,753,843 to Fay, entitled--

Column 13:
Line 20, "to music engine" should read --to the music engine--
Line 44, "to music engine" should read --to the music engine--
Line 50, "skips step 616 continues as" should read --skips step 616 and continues to--

Column 14:
(Claim1, line 13) Line 14, "displaying the" should read --displaying of the --

UNITED STATES PATENT AND TRADEMARK OFFICE
CERTIFICATE OF CORRECTION

PATENT NO.   : 6,072,480
DATED         : June 6, 2000
INVENTOR(S) : D.P.H. Gorbet et al.

It is certified that error appears in the above-identified patent and that said Letters Patent is hereby corrected as shown below:

Column 15:
(Claim 5, line 1) Line 3, "3 wherin" should read --3, wherein--

Column 16:
(Claim 14, line 9) Line 33 the phrase "automatically performing the second desired motif in response to a predetermined event occurring during a display of the second electronic slide." should begin a new subparagraph Column 16:
(Claim 15, line 8) Line 44, the phrase "providing the data to a music engine that automatically composes the soundtrack bases on the retrieved data; and "should begin a new subparagraph
(Claim 15, line 12) Line 49, "playing the electronic slide show." should read --playing of the electronic slide show.--
(Claim 16, line 17) Line 66, "displaying the" should read --displaying of the--

Column 17:
(Claim 16, line 20) Line 2, "displaying the" should read --displaying of the--
(Claim 17, line 20) Line 4, "16 having" should read --16, having--
(Claim 17, line 6) Line 9, "performing the" should read --performing of the--
(Claim 17, line 7) Line 10, "performing the" should read --performing of the--

Signed and Sealed this

Nineteenth Day of June, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.   : 6,072,480
DATED        : June 6, 2000
INVENTOR(S)  : D.P.H. Gorbet et al.

It is certified that error appears in the above-identified patent and that said Letters Patent is hereby corrected as shown below:

Item [54], Column 1,
Title,
"METHOD AND APPARATUS FOR CONTROLLING COMPOSITION AND PERFORMANCE OF SOUNDTRACKS TO ACCOMPANY A SLIDE SHOW" should read -- METHOD AND APPARATUS FOR DYNAMICALLY CREATING SOUNDTRACKS TO ACCOMPANY A SLIDE SHOW BY AUTOMATICALLY CONTROLLING SOUNDTRACK COMPOSITION AND PERFORMANCE --

Column 1,
Line 1, "METHOD AND APPARATUS FOR CONTROLLING COMPOSITION AND PERFORMANCE OF SOUNDTRACKS TO ACCOMPANY A SLIDE SHOW" should read -- METHOD AND APPARATUS FOR DYNAMICALLY CREATING SOUNDTRACKS TO ACCOMPANY A SLIDE SHOW BY AUTOMATICALLY CONTROLLING SOUNDTRACK COMPOSITION AND PERFORMANCE --

Column 4,
Line 10, "dynamically" should read -- and dynamically --

Column 7,
Line 16, "name, that" should read -- name that --
Line 49, "5,754,843 to" should read -- 5,753,843 to Fay, entitled --

Column 13,
Line 20, "to music engine" should read -- to the music engine --
Line 44, "to music engine" should read -- to the music engine --
Line 50, "skips step 616 continues as" should read -- skips step 616 and continues to --

Column 14,
Line 41 (Claim 1, line 13), "displaying the" should read -- displaying of the --

Column 15,
Line 3 (Claim 5, line 1), "3 wherin" should read -- 3, wherein --

Column 16,
Line 33 (Claim 14, line 9), the phrase "automatically performing the second desired motif in response to a predetermined event occurring during a display of the second electronic slide." should begin a new subparagraph

UNITED STATES PATENT AND TRADEMARK OFFICE
CERTIFICATE OF CORRECTION

PATENT NO. : 6,072,480
DATED : June 6, 2000
INVENTOR(S) : D.P.H. Gorbet et al.

It is certified that error appears in the above-identified patent and that said Letters Patent is hereby corrected as shown below:

<u>Column 16, contd.</u>
Line 44 (Claim 15, line 8), the phrase "providing the data to a music engine that automatically composes the soundtrack based on the retrieved data; and" should begin a new subparagraph
Line 49 (Claim 15, line 12), "playing the electronic slide show." should read -- playing of the electronic slide show. --
Line 66 (Claim 16, line 17), "displaying the" should read -- displaying of the --

<u>Column 17,</u>
Line 2 (Claim 16, line 20), "displaying the" should read -- displaying of the --
Line 4 (Claim 17, line 1), "16 having" should read -- 16, having --
Line 9 (Claim 17, line 6), "performing the" should read -- performing of the --
Line 10 (Claim 17, line 7), "performing the" should read -- performing of the --

THIS CERTIFICATE SUPERCEDES CERTIFICATE OF CORRECTION ISSUED JUNE 19, 2001

Signed and Sealed this

Sixteenth Day of October, 2001

Attest:

NICHOLAS P. GODICI
Attesting Officer
Acting Director of the United States Patent and Trademark Office